United States Patent [19]

Harding

[11] Patent Number: 4,520,571

[45] Date of Patent: Jun. 4, 1985

[54] BASE PLATE BOLT HOLE MARKER

[76] Inventor: Delbert Harding, 751 W. 44th St., San Angelo, Tex. 76903

[21] Appl. No.: 547,230

[22] Filed: Oct. 31, 1983

[51] Int. Cl.[3] .......................... B23B 49/02; B25H 7/04

[52] U.S. Cl. .................................. 33/189; 33/180 R; 33/42

[58] Field of Search ................ 33/189, 191, 42, 180 R

[56] References Cited

U.S. PATENT DOCUMENTS

| | | | |
|---|---|---|---|
| 912,052 | 2/1909 | Albertson | 33/189 |
| 2,786,274 | 3/1957 | Early | 33/41 |
| 2,830,378 | 4/1958 | Givan | 33/189 |
| 2,961,773 | 11/1960 | Honn | 33/197 |
| 3,284,911 | 11/1966 | Clark | 33/189 |
| 3,406,460 | 6/1968 | Colwell | 33/189 |
| 4,363,173 | 12/1982 | Caldera | 33/180 R |
| 4,389,790 | 6/1983 | Dunlap | 33/185 R |

OTHER PUBLICATIONS

"American Machinist"—Jul. 28, 1949; p. 104—by Allan B. Nixon.

*Primary Examiner*—Willis Little
*Attorney, Agent, or Firm*—Charles D. Gunter, Jr.

[57] ABSTRACT

A base plate bolt hole marker is shown of the type used to mark bolt holes on a base plate in slab construction where foundation bolts are provided at spaced intervals along the edge of a concrete slab. The marker includes a handle portion and a measuring arm slidably received within the handle portion. The measuring arm has a bolt engaging end for engaging the foundation bolts. A marking member carried on the measuring arm is used to mark the location of a bolt hole on the base plate. A depending flange affixed to the handle portion of the device is used to align the device with the edge of the base plate whereby the measuring arm extends generally perpendicular to the axis of the base plate when the depending flange contacts the base plate. The distance between the bolt engaging end of the tool and the depending flange is adjustable by varying the position of the measuring arm with respect to the handle portion to mark bolt holes in base plates of varying widths.

4 Claims, 3 Drawing Figures

BASE PLATE BOLT HOLE MARKER

BACKGROUND OF THE INVENTION

This invention relates in general to measuring and marking devices of the type used in building frame construction. Specifically, this invention relates to a bolt hole marker used for marking the location of bolt holes in the base plate of frame construction utilizing concrete slab floors.

A conventional technique used in construction of residential and commercial buildings involves concrete foundations made of poured concrete with threaded securing bolts being set upright in the edges of the wet concrete for subsequently securing the base plate, also called a mudsill, in the frame structure. In the past, the wood mudsill was marked for the drilling of holes to fit over the preset bolts by placing the mudsill on top of the bolts and hitting the wood mudsill with a hammer to leave the impression of the bolt ends on the under side of the mudsill. The problem with this approach was that the bolt portions extending from the concrete floor were sometimes less than perfectly perpendicular, which resulted in the bolt hole marking technique failing to properly align the hole with the actual point of entry of the bolt into the concrete foundation. As a result, the poor alignment of the bolt holes in the mudsill with the actual bolt portions extending from the concrete floor caused the carpenter to expend additional time and effort in straightening the bolts and hammering the mudsill into position. Often times, the mudsill would be split or a bolt would be broken out of the foundation in an attempt to secure the mudsill to the floor.

In an attempt to correct the problem of alignment, workers would, on occasion, drill holes in the wooden mudsill or plate which were larger than the bolt diameters. The problem with this approach was that it lessened the mudsill stability and strength, causing problems in supporting the frame structure erected above the floor.

U.S. Pat. No. 3,406,460, issued Oct. 22, 1968, entitled "BOLT HOLE MARKER" shows a device used to provide improved bolt hold marking for use in frame construction on top of concrete foundations. The device included a handle with a shank extending therefrom, the shank having a centering notch at the end thereof for contacting a bolt. The device also included a fixed punch located on the shank which was centered over the base plate to be marked and which was struck with a hammer to mark the bolt hole position. The punch was not adjustable with respect to the centering notch and no means was provided for aligning the device with respect to the plate edge so that the shank would extend perpendicular to the plate longitudinal axis.

SUMMARY OF THE INVENTION

The base plate bolt hole marker of the invention has a handle portion with a measuring arm connected to the handle portion, the measuring arm having a bolt engaging end. A marking member is carried on the measuring arm for marking the location of a bolt hole on the base plate. A depending flange is affixed to the handle portion for aligning the marker with respect to the base plate, whereby the measuring arm extends generally perpendicular to the longitudinal axis of the base plate when the depending flange contacts the base plate.

Preferably, the measuring arm is slidably received within the handle portion. The distance between the bolt engaging end and the depending flange is adjustable by varying the position of the measuring arm with respect to the handle portion to mark bolt holes in base plates of varying widths. The bolt engaging end of the measuring arm is also adjustable to vary the length of the measuring arm. The measuring arm is preferably a cylindrical tube which is received within a cylindrical passage within the handle portion. The measuring arm is biased outwardly by a coil spring located within the handle cylindrical passage. The marking member is carried within a cylindrical opening on the measuring arm. A coil spring is received within the cylindrical opening about the marking member to provide recoil energy for the marking member and the marking member includes a knob portion for applying striking force to mark the position of a bolt hole on a base plate.

Additional objects, features and advantages will be apparent in the written description which follows.

DETAILED DESCRIPTION OF THE INVENTION

Figure 3:
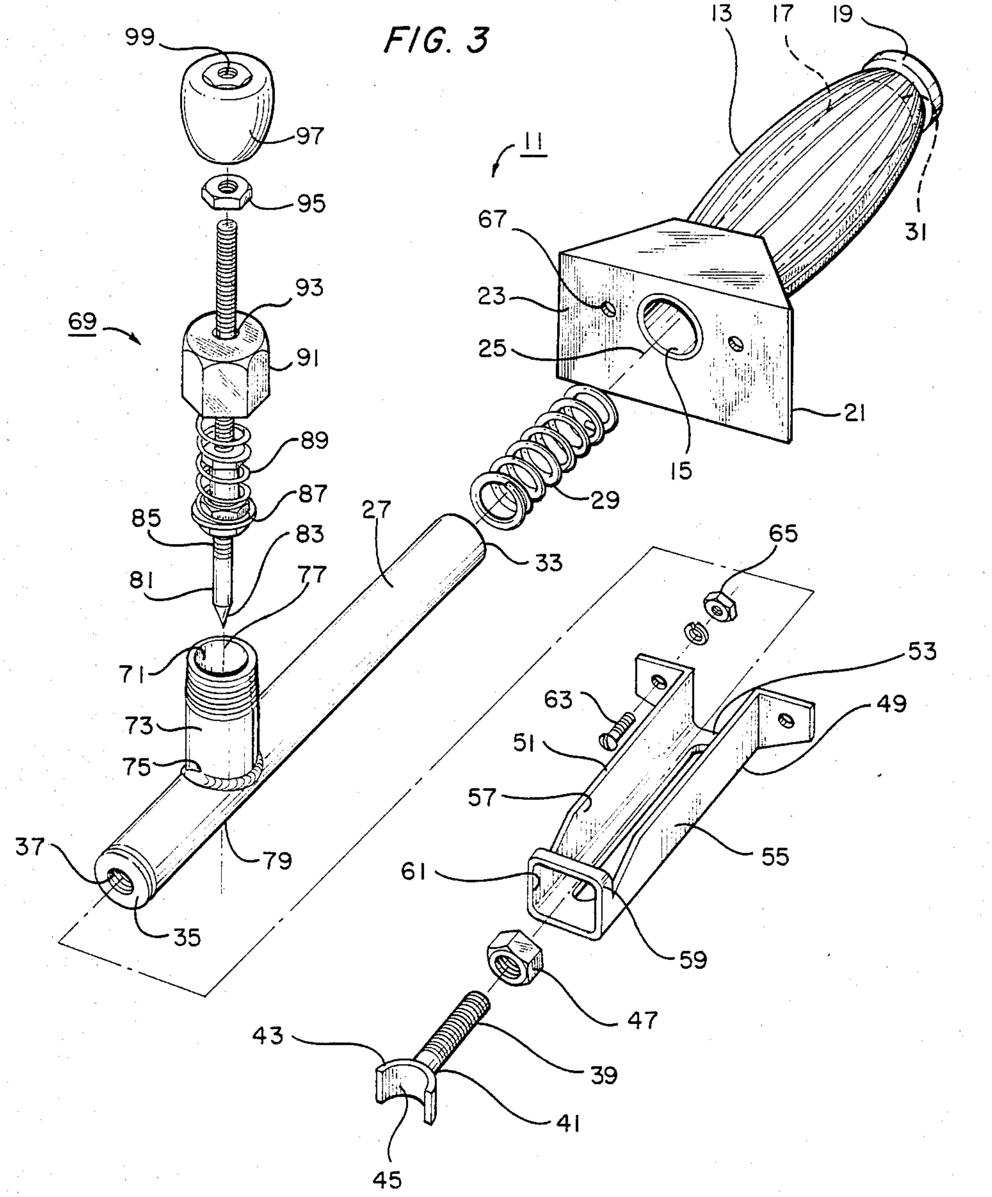
FIG. 3 is an exploded view of the marker of FIG. 1 showing the assembly of the parts thereof.

FIG. 3 shows a base plate bolt hole marker designated generally as 11. The bolt hole marker includes a handle portion 13 having a cylindrical passage 15. The cylindrical passage 15 can comprise the internal diameter of a steel tube, indicated by dotted lines 17 in FIG. 3. A flexible rubber glove or handle 19 covers that portion of the tube 17 distant the opening to the cylindrical passage 15 to provide the user with an improved grip on the device.

An aligning means such as depending flange 21 is rigidly affixed to the tube 17 adjacent the opening to the passage 15 as by welding the flange 21 to the tube 17. As shown in FIG. 3, the plane of the exterior face 23 of the flange 21 is generally perpendicular to the longitudinal axis 25 of the handle portion 13 and the handle passage 15.

A measuring arm 27, which can conveniently be a cylindrical tube, is received within the cylindrical passage 15 within the handle portion 13. The internal diameter of the cylindrical passage 15 is slightly larger than the outer diameter of the measuring arm 27 whereby the measuring arm 27 is slidable into and out of the passage 15. A coil spring 29 is received within the passage 15 between the tube end 31 (shown in dotted lines of FIG. 3) and the inner extent 33 of the measuring arm 27, whereby the measuring arm is biased outwardly in the direction opposite the tube end 31.

The measuring arm end 35 opposite the inner extent 33 includes a threaded bore 37 of reduced diameter which is adapted to receive the mating threaded shaft 39 of a bolt engaging member 41. The bolt engaging member 41 includes an arcuate bolt engaging end 43 having a concave surface 45 for engaging a foundation bolt. As will be understood by reference to FIG. 3, the length of the measuring arm 27 can be increased or decreased by screwing the threaded shaft 39 of the bolt engaging member 41 into and out of the threaded bore 37. A nut 47 is carried on the threaded shaft 39 and contacts the end 35 of the measuring arm 27 for securing the bolt engaging member 41 at the desired location within the threaded bore 37.

A slide member 49 is used to support the measuring arm 27 from the handle portion 13. The slide member 49 includes an open channel portion 51 with a bottom wall 53 and side walls 55, 57. The slide member 49 also includes a square end bracket 59 having an opening 61 through which the measuring arm end 35 passes. The slide member 49 is secured to the depending flange 21 of the handle portion 13 as by bolts 63 and nuts 65 received within suitable holes 67 on the depending flange 21.

The bolt hole marker 11 also includes a marking member, designated generally as 69 in FIG. 3. The marking member 69 is carried within a cylindrical opening 71 of a marking tube 73 which is welded at an opening 75 in the measuring arm 27. The marking tube 73 is arranged with the longitudinal axis 77 thereof perpendicular to the axis 25 of the measuring arm 27. The measuring arm 27 also includes a bottom opening 79 of lessor relative diameter than the opening 71 for receiving the shaft 81 of a marking member punch 83. The punch 83 includes a threaded portion 85 on which is carried a lower nut and washer 87. A coil spring 89 is carried between the washer 87 and an upper washer (not shown) within the interior of an internally threaded cap 91. The threaded cap 91 includes a top opening 93 through which the threaded portion 85 of the punch 83 extends. A mating nut 95 is received on the threaded shaft 85 above the cap 91 and a knob 97 having an internally threaded opening 99 is secured on the shaft 85 above nut 95. The marking member punch 83 can be propelled downwardly to exert a striking force through the bottom opening 79 by pulling the knob 97 upwardly to compress the coil spring 89 within the marking tube 73.

Figure 1:
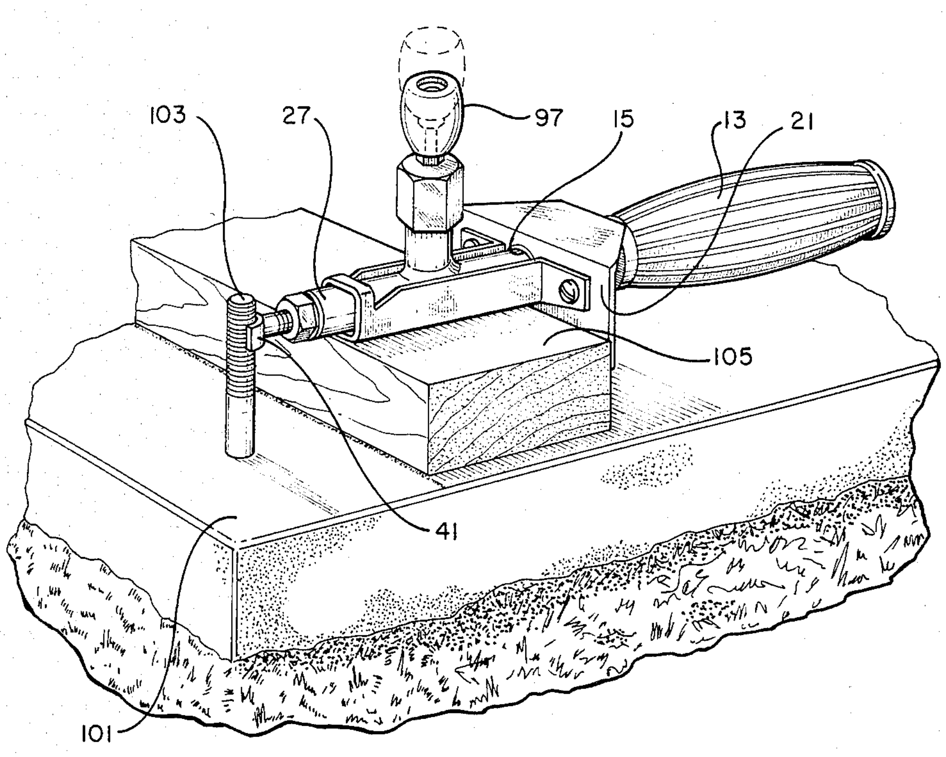
FIG. 1 is a perspective view of the base plate marker of the invention showing the device in use in marking a base plate on a concrete foundation.
Figure 2:
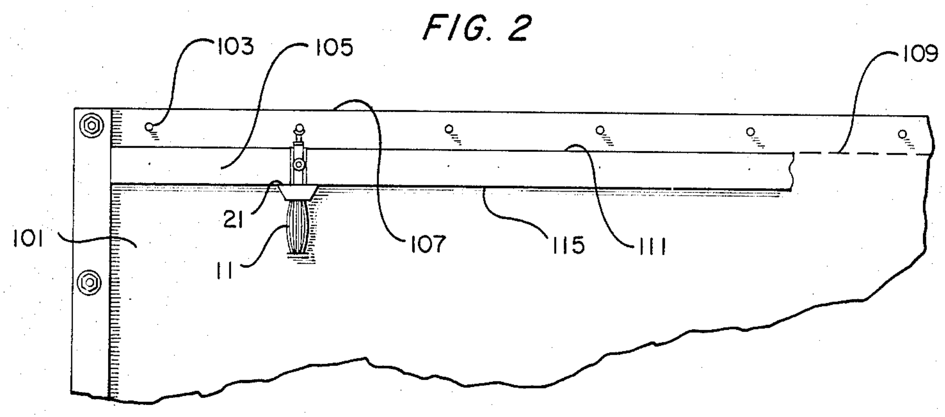
FIG. 2 is a top perspective view of the device of FIG. 1 showing the operation thereof on a concrete foundation.

The operation of the bolt hole marker of the invention can be understood with reference to FIGS. 1 and 2. FIG. 2 illustrates the corner section of a concrete slab 101 having foundation bolts 103 set therein. In the normal operation of the device, a 2×4 base plate or mudsill 105 is used and the foundation bolts 103 are approximately ½ the width of the 2×4 from the slab edge 107 or approximately 1 13/16 inches. A chalk line 109 is then laid down on the concrete slab 101 and is snapped back from the edge 107 a distance equal to the width of the 2×4 mudsill, or approximately 3⅝" wide. The outside edge 111 of the base plate 105 is then laid along the chalk line as shown in FIG. 2 and the bolt hole marking device 11 is positioned with the depending flange 21 aligned with the inside edge 115 of the base plate 105.

As shown in FIG. 1, the measuring arm 27 is then allowed to slide in or out as necessary within the passage 15 in the handle portion 13 so that the bolt engaging member 41 contacts the foundation bolt 103. The depending flange 21 insures that the measuring arm 27 is aligned generally perpendicular to the longitudinal axis of the base plate 105 so that the punch 83 (FIG. 3) is aligned and centered over the base plate 105. The worker then marks the bolt hole location by pulling the knob 97 upwardly, as indicated by dotted lines in FIG. 1, and releasing the punch 83. The punch 83 is allowed to strike the base plate 105, thus making an indentation which marks the bolt hole location.

An invention has been provided with significant advantages. The bolt hole marker of the invention has an aligning flange secured to the handle portion which properly aligns the measuring arm perpendicular to the axis of the plate to be marked. The measuring arm of the device is slidable into or out of the handle portion so that the distance between the bolt engaging end and the depending flange can be varied to mark base plates of varying widths. The adjustable bolt engaging member provides additional adjustment in the length of the measuring arm while maintaining the compact size of the tool when smaller width plates are to be marked. The spring biased marking member punch allows the worker to quickly mark bolt hole locations without the use of a hammer, thus allowing the operations to be carried out with a single tool. The bolt hole marker of the invention can be constructed of commonly available materials and is simple and inexpensive to produce.

While the invention has been shown in only one of its forms, it is not thus limited but is susceptible to various changes and modifications without departing from the spirit thereof.

I claim:

1. A base plate bolt hole marker of the type used to mark bolt holes on a base plate in slab construction where foundation bolts are provided at spaced intervals along the edge of a concrete slab, comprising:

a handle portion;

a measuring arm slidably received within said handle portion, said measuring arm having a bolt engaging end;

a marking member carried on said measuring arm for marking the location of a bolt hole on a base plate;

a depending flange affixed to said handle portion for aligning said marker with respect to said base plate whereby said measuring arm extends generally perpendicular to the longitudinal axis of said base plate when said depending flange contacts said base plate, the distance between said bolt engaging end and said depending flange being adjustable by varying the position of said measuring arm with respect to said handle portion to mark bolt holes in base plates of varying widths; and wherein said bolt engaging end of said measuring arm is adjustable to vary the length of said measuring arm.

2. A base plate bolt hole marker of the type used to mark bolt holes on a base plate in slab construction where foundation bolts are provided at spaced intervals along the edge of a concrete slab, comprising:

a handle portion;

a measuring arm slidably received within said handle portion, said measuring arm having a bolt engaging end, and wherein said measuring arm is a cylindrical tube which is received within a cylindrical passage within said handle portion, said measuring arm being biased outwardly by a coil spring located within said cylindrical passage;

a marking member carried on said measuring arm for marking the location of a bolt hole on a base plate; and a depending flange affixed to said handle portion for aligning said marker with respect to said base plate whereby said measuring arm extends generally perpendicular to the longitudinal axis of said base plate when said depending flange contacts said base plate, the distance between said bolt engaging end and said depending flange being adjustable by varying the position of said measuring arm with respect to said handle portion to mark bolt holes in base plates of varying widths.

3. A base plate bolt hole marker of the type used to mark bolt holes on a base plate in slab construction where foundation bolts are provided at spaced intervals along the edge of a concrete slab, comprising:

a handle portion;

a measuring arm slidably received within said handle portion, said measuring arm having a bolt engaging end;

a marking member carried on said measuring arm for marking the location of a bolt hole on a base plate, said marking member comprising a spring biased punch, and wherein said marking member is carried within a cylindrical opening on said measuring arm, a coil spring being received within said cylindrical opening about said marking member punch, and wherein said marking member includes a knob portion for applying striking force to said punch; and a depending flange affixed to said handle portion for aligning said marker with respect to said base plate whereby said measuring arm extends generally perpendicular to the longitudinal axis of said base plate when said depending flange contacts said base plate, the distance between said bolt engaging end and said depending flange being adjustable by varying the position of said measuring arm with respect to said handle portion to mark bolt holes in base plates of varying widths.

4. A method of marking bolt holes on a base plate in slab construction where foundation bolts are provided at spaced intervals along the edge of a concrete slab, comprising the steps of:

providing a bolt hole marking device having a handle portion with a measuring arm slidably received within said handle portion, said measuring arm having a bolt engaging end, and providing a marking member carried on said measuring arm for marking the location of a bolt hole on a base plate;

providing said handle portion with a depending flange for aligning said marker with respect to said base plate;

marking said concrete slab with a chalk line along the entire edge of said concrete slab, said chalk line being spaced back from the edge of said concrete slab a distance equal to the width of said base plate;

placing said base plate edge on the inside of and next to said chalk line;

placing said marker depending flange against the edge of said base plate opposite said chalk line and adjusting said measuring arm to thereby contact said foundation bolt with said bolt engaging end; and marking said location with said marking member.

* * * * *